United States Patent [19]

Lin et al.

[11] Patent Number: 5,230,028
[45] Date of Patent: Jul. 20, 1993

[54] ELECTRO-OPTIC INTENSITY MODULATOR WITH IMPROVED LINEARITY

[75] Inventors: Zong-Qi Lin, San Diego; William S. C. Chang, La Jolla, both of Calif.

[73] Assignee: The Regents of the University of California, Alameda, Calif.

[21] Appl. No.: 801,940

[22] Filed: Dec. 2, 1991

[51] Int. Cl.⁵ .............................. G02B 6/10
[52] U.S. Cl. ........................ 385/3; 385/41
[58] Field of Search ...................... 385/1-3, 385/40, 41, 14

[56] References Cited

U.S. PATENT DOCUMENTS

| | | | |
|---|---|---|---|
| 5,002,353 | 3/1991 | Johnson | 385/3 |
| 5,011,264 | 4/1991 | Bradley et al. | 385/2 |
| 5,015,053 | 5/1991 | Johnson | 385/2 |

OTHER PUBLICATIONS

"Waveguide Modulators with Extended Linear Dynamic Range-A Theoretical Prediction", Zong-Qi Lin and William S. C. Chang, IEEE Photonics Tech. Lett., vol. 2, No. 12, Dec. 1990.
"An Electrooptic Intensity Modulator with Improved Linearity", Farwell, et. al., IEEE Photonics Tech. Lett., vol. 3, No. 9, Sep. 1991.
"Intermodulation Distortion in a Directly Modulated Semiconductor Injection Laser" Lau, K. Y. et al., Appl. Phys. Lett 45(10), Nov. 15, 1984, pp. 1034-1036.
"In Search of a Linear Electrooptic Amplitude Modulator", Liu, Pao-Lo et. al., IEEE Photonics Tech. Lett., vol. 3, No. 2, Feb. 1991, pp. 144-146.

Primary Examiner—Frank Gonzalez
Attorney, Agent, or Firm—Brown, Martin, Haller & McClain

[57] ABSTRACT

The improved intensity modulator comprises a directional coupler with a single active coupling section with a fixed amount of coupling along with a single pair of electrodes for supplying a voltage-controlled mismatch in propagation constants. Two passively-biased coupling sections are connected in series with the active section, with the two passive sections combined being at least one coupling length long. The bias voltage of the two passive sections are independently varied to compensate for non-linearities by providing additional coupling. In an alternate embodiment, a voltage-controlled directional coupler is connected in series with a fixed Mach-Zehnder modulator and a fixed directional coupler, and linearity is obtained by varying the phase shift of the Mach-Zehnder modulator, the length of the fixed directional coupler, and the length and coupling coefficient of the active coupler.

14 Claims, 2 Drawing Sheets

ELECTRO-OPTIC INTENSITY MODULATOR WITH IMPROVED LINEARITY

BACKGROUND OF THE INVENTION

Electro-optic communication systems historically have been more suited to digital modulation than analog modulation. This is due in part to the tradeoff between bandwidth and signal-to-noise ratio in optical systems. However, digital encoding is not always practical for conversion of signals with a large number of channels, such as telephone and video signals, primarily for economic reasons. By eliminating the need for encoding and decoding, the complexity and cost of analog communication systems can be greatly reduced.

The most obvious analog modulation scheme for optical communication systems is direct laser modulation. An obstacle to the success of such a system is the nonlinear relationship of the intrinsic input current to the output intensity of typical light-emitting devices. Distortion of the signal caused by non-linearities can be a problem, particularly in multi-channel systems where a high degree of linearity is required to prevent interchannel cross-talk.

External modulation of CW lasers may be more attractive than direct modulation since, without modulation of input current, such lasers possess spectral stability and low relative intensity noise (RIN). External modulation does not rely on the laser input current to output intensity characteristics, but relies on the input-to-output characteristics of the modulator itself. Thus, linear electro-optical waveguide modulators are extremely important for analog optical fiber communication and signal processing applications.

Well known external modulators do not provide an absolute solution, however, since existing modulators possess their own nonlinear characteristics, thus limiting their linear dynamic range in their application in critical areas, such as radar and CATV. Such modulators include Mach-Zehnder interferometers, directional couplers and absorption modulators. A few techniques for enhancing the linearity of external modulators have been reported. Typically, the nonlinear responses of two modulators are combined in parallel, with the nonlinear response of one used to cancel that of the other. Some improvement in linearity has been demonstrated with parallel combination of Mach-Zehnder modulators and with polarization mixing. These parallel schemes, however, not only require precise control over the parameters in one modulator but also simultaneous relative control over the same parameters between the two parallel components. Hence, the controllability and fabrication tolerance requirements of these designs may be difficult to meet.

Designs have been proposed that combine the nonlinear responses of modulators in series. Feeding the output from a Mach-Zehnder into a synchronously-modulated directional coupler has been proposed by Liu et al., "In Search of a Linear Electro-optic Amplitude Modulator", *IEEE Photon. Technol. Lett.*, Vol. 3, pp. 144-146, February, 1991. While such a system provides extended linearity, simultaneous control is still an issue. Further, serial combination of active modulators may limit the bandwidth of the desired linear response.

It would be desirable to provide a modulator with improved linearity which does not require simultaneous control of active sections nor does it restrict the bandwidth of the active section. It is to such a modulator that the present invention is directed.

SUMMARY OF THE INVENTION

One advantage of the intensity modulator of the present invention is that it provides substantial improvement in linearity with simplicity and reasonable tolerances.

Another advantage of the present invention is that simultaneous control of active coupling sections is not required.

Still another advantage of the present invention is that the bandwidth of the active section is not restricted.

In an exemplary embodiment, the improved intensity modulator comprises a directional coupler with a single active coupling section with a fixed amount of coupling along with a single pair of electrodes for supplying a voltage-controlled mismatch in propagation constants between the two channels which feed the coupler. Two passively-biased coupling sections are connected in series with the active section, with the two passive sections combined being at least one coupling length long. The bias voltage of the two passive sections are independently varied to compensate for non-linearities by providing additional coupling.

In an alternate embodiment, a voltage-controlled directional coupler is connected in series with a fixed Mach-Zehnder modulator and a fixed directional coupler, and linearity is obtained by varying the phase shift of the Mach-Zehnder modulator, the length of the fixed directional coupler, and the length and coupling coefficient of the active coupler.

In both embodiments, fabrication and operational tolerances are relaxed relative to parallel schemes because simultaneous control of active sections is not required.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
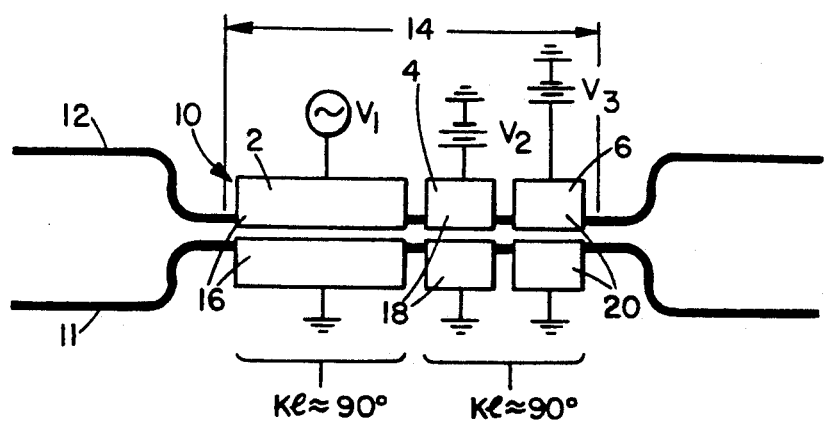
FIG. 1 is a diagrammatic view of an intensity modulator with improved linearity according to the present invention.

As illustrated in FIG. 1, the waveguide modulator consists of an active section 2 and two passive sections 4 and 6. Directional coupler 10 has first channel 11 and second channel 12, the space between which is narrowed, as is known in the art, for a predetermined length 14 to permit transfer of optical energy between the channels. Length 14 is divided to form sections 2, 4 and 6 by defining a pair of electrodes corresponding to each section. The electrode pair 16 provides means for supplying a voltage-controlled mismatch in propagation constants between the two channels 11 and 12. Electrode pairs 18 and 20 define sections 4 and 6, respectively, and provide means by which passive biases can be applied to these sections. In order to obtain optimal nonlinear compensation, the lengths of electrode pairs 18 and 20 should, together, be equal or greater than the length of electrode pair 16.

Figure 2:
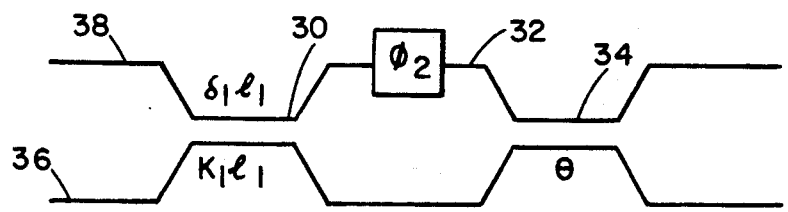
FIG. 2 is a diagrammatic view of an alternate embodiment of the intensity modulator with improved linearity.

In the alternate embodiment illustrated in FIG. 2, voltage-controlled directional coupler 30 is connected in series with a fixed Mach-Zehnder interferometer 32 with phase shift $\phi_2$ and a fixed directional coupler 34. The modulation is introduced into first channel 36. Second channel 38 is used to introduce an appropriate feedback so that the modulated power output from the first channel 36 has more linear dependence on the applied modulation voltage V. The method for determining the values of phase mismatch introduced by directional coupler 30 and the phase shift by Mach-Zehnder interferometer 32 is described below.

The following explanation and mathematical analyses provide a means by which the parameters are selected for both embodiments.

A conventional directional coupler consists of a single coupling section with a fixed amount of coupling ($\kappa l = 90°$, where $\kappa$ is the coupling coefficient and $l$ is the length of the coupler) along with a single pair of electrodes which supply a voltage-controlled mismatch in propagation constants between the two channels ($\delta l = (\Delta\beta/2)l$, where $\beta$ is the propagation constant).

Looking at the example of a typical analog link consisting of a CW laser, a perfectly-linear modulator, a transmission link and a linear detector followed by a linear amplifier and bandpass filter, the electrical dynamic range of such a system is given by:

$$DR = 20 \log \left[ \frac{\overline{(i_s)}}{\overline{(i_n)}} \right] \quad (1)$$

where $\overline{i_s}$ and $\overline{i_n}$ are the equivalent signal and noise current, respectively, at the output of the detector. The $i_s$ will be proportional to the modulated optical power, the transmission of the optical link and the detector response. The modulated optical power, i.e., the optical signal power, is the product of the optical carrier power $I_O$ and the modulator transfer function T(V) where V is the applied electrical modulation voltage. The receiver is assumed to be linear. For a given $i_n$ and a perfectly-linear modulator, both the $I_O$ and the modulation index m, i.e., the $i_s$, can be made arbitrarily large in order to obtain a very large DR. However, for practical modulators, T is not a linear function of V. There will be a limitation of the DR given by 20 log(optical signal power/spurious signal power). The maximum linear DR of the system is obtained when the spurious signal power due to nonlinear distortion is equal to the equivalent noise power.

Figure 3:
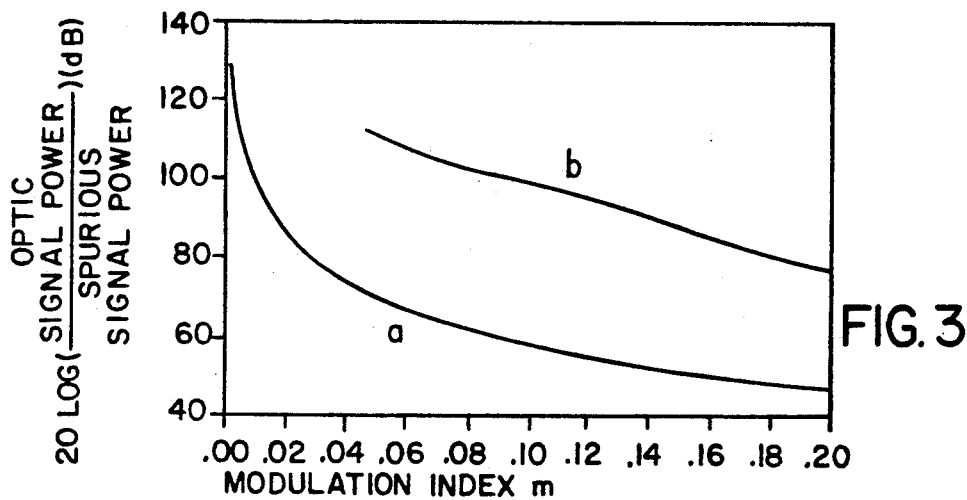
FIG. 3 is a plot of the ratio of optical signal power to spurious signal power versus modulation index.

Using the discrete two-tone test, as is known in the art (see, e.g., K. Y. Lau et al., "Intermodulation Distortion in a Directly Modulated Semiconductor Injection Laser", *Appl. Phys. Lett.*, Vol. 45, No. 10, pp. 1034–1036, 1984), the nonlinear distortion of an external modulator can be evaluated. For typical modulators, such as the Mach-Zehnder, the output intensity has a sinusoidal dependence on the applied voltage so that:

$$I = I_0 T(V) = I_0 [1 + \sin KV] = \quad (2)$$
$$I_0 [1 = \sin(m \cos\omega_1 t + m \cos\omega_2 t)]$$

where V is the instantaneous applied voltage, K is a proportionality constant, and m is the modulation index. The third order inter-modulation terms at $2\omega_2 - \omega_1$ and $2\omega_1 - \omega_2$ frequencies constitute the spurious signal power. The ratio of the optical signal power to the spurious signal power is $8/m^2$, as shown by curve a in FIG. 3. For conventional directional coupler devices, the ratio optical signal power to the spurious signal power has a similar value.

From above, the ratio of optical signal power to spurious signal power due to third order intermodulation can be increased by reducing m. For example, at m=0.007, this ratio is 104 dB for devices such as the Mach-Zehnder modulator. However, in order to realize the 104 dB linear dynamic range, $I_O$ must be increased so that the $\overline{i_s}/\overline{i_n}$ ratio will be sufficiently large. A reduction of m by n times implies an increase of $I_O$ by $n^2$ or n times, depending on whether the detector is dominated by shot noise or by Johnson noise. $I_O$ is usually limited in practice by either the laser power or the saturation intensity of the modulator. Thus, reduction of nonlinear distortion of T(V) is important so that a larger m, or a smaller $I_O$, can be used to achieve the desired linear dynamic range.

Compensation for non-linearities can be achieved by equivalent feed forward interaction using either two passively-biased coupling sections, as shown in FIG. 1, or a fixed phase shifter plus fixed coupler, as shown in FIG. 2.

Figure 4:
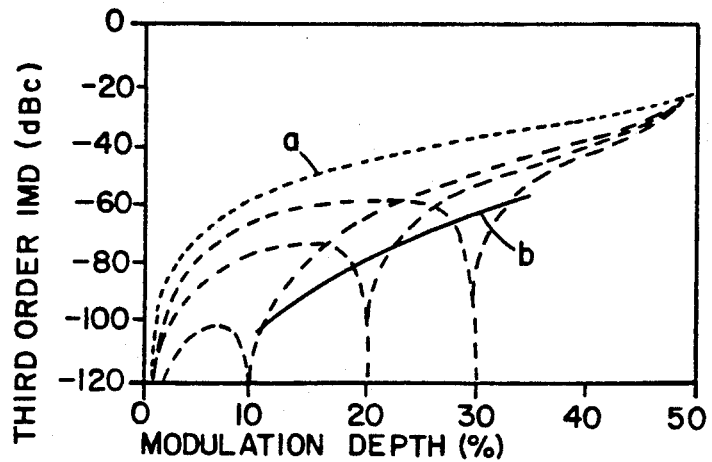
FIG. 4 is a plot of the spurious signal power (third order IMD) versus modulation depth.

In the first embodiment, calculations show that if the two passive sections 4 and 6 are at least one coupling length long, i.e., $\kappa_2 l_2 \geq \kappa_1 l_1$, optimal nonlinear compensation is possible at any modulation depth, regardless of the exact coupling length of the actively-modulated directional coupler section 2. Using a computer simulation, third order inter-modulation distortion (IMD) levels can be plotted as a function of modulation depth. The computer program time-samples the theoretical response to a two-tone signal and uses the fast Fourier transform (FFT) to obtain a theoretical output spectrum. This approach allows for calculation of spurious signals at the necessary low levels and, in addition, includes contributions from all orders of non-linearities. FIG. 4 illustrates the spurious signal versus modulation depth for $\kappa l_1 = 2\kappa l_3 = 115°$ and for $\delta l_1$ (active bias), $\delta l_2$ and $\delta l_3$, optimized to eliminate the third order IMD at the modulation depths of 9, 20 and 30%. For comparison, curve a in FIG. 4 gives a similar plot of an optimally biased conventional directional coupler (or Mach-Zehnder). Curve b gives the minimized largest third order IMD level. Comparison with a conventional directional coupler (or Mach-Zehnder) curve a yields the expected third order IMD suppression of the compensated directional coupler.

Figure 5:
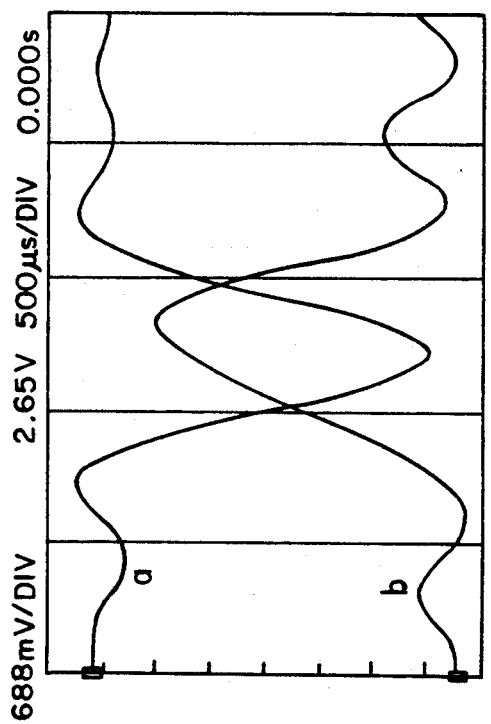
FIG. 5 is an exemplary oscilloscope trace of intensity versus voltage.

The waveguide modulator illustrated in FIG. 1 is fabricated by using commercially-available directional coupler waveguide structures. The waveguides used in development of the present invention were fabricated on z-cut $LiNbO_3$ with titanium indiffusion and were slightly over two coupling lengths long. An $SiO_2$ buffer layer was deposited on the waveguide structures and three electrode pairs were fabricated using aluminum evaporation, with the pairs corresponding to the active section and two passive sections. The lengths of the electrode pairs were selected so that $l_2$ of section 4 equals $l_3$ of section 6 equals $\frac{1}{2} l_1$ of section 2, so that both the active section and the combined passive sections would be at least one coupling length long. For testing purposes, a diode-pumped YLF laser operating at 1.31 micron, input and output polarization maintaining fibers and an InGaAs detector were connected with the waveguide modulator. Operation of a conventional directional coupler could be simulated by setting the bias voltages $V_2$ and $V_3$ for sections 4 and 6, respectively, to a sufficiently high voltage to decouple the channels below the passive electrodes. In this case, 33 V was used. Curve a in FIG. 5 was an exemplary oscilloscope trace for this condition. When $V_2$ and $V_3$ are reduced, additional coupling is introduced between the channels under the passive electrodes. The additional coupling inverts the oscilloscope trace (curve b) and allows tuning of the passive voltages to provide additional coupling response. Curve b shows the trace when passive voltages were tuned to reduce the optimal linearized response shape, i.e., $V_2 = 1.15$ V and $V_3 = -3.85$ V.

In the alternate embodiment illustrated in FIG. 2, the amount of phase shift $\phi_2$ which is to be introduced by the Mach-Zehnder interferometer may be determined as follows:

The transfer-matrix M of the entire modulator illustrated in FIG. 2 is:

$$[M] = \begin{bmatrix} \cos\theta & -j\sin\theta \\ -j\sin\theta & \cos\theta \end{bmatrix} \cdot \begin{bmatrix} e^{j(\phi_2/2)} & 0 \\ 0 & e^{-j(\phi_2/2)} \end{bmatrix} \begin{bmatrix} A & -jB \\ -jB & A^* \end{bmatrix} \quad (3)$$

where:

$$A = \cos\sqrt{(\kappa_1 l_1)^2 + (\delta_1 l_1)^2} + j\left(\frac{\delta_1}{\sqrt{\kappa_1^2 + \delta_1^2}}\right) \cdot \quad (4)$$

$$\sin\sqrt{(\kappa_1 l_1)^2 + (\delta_1 l_1)^2};$$

$$B = \left(\frac{\kappa_1}{\sqrt{\kappa_1^2 + \delta_1^2}}\right) \cdot \sin\sqrt{(\kappa_1 l_1)^2 + (\delta_1 l_1)^2};$$

$\theta = \kappa_2 l_2$; and $\kappa_1$ is the coupling coefficient of coupler 30;
$\delta_1$ is the difference in propagation wave number of the two-channel waveguide modes for coupler 30;
$l_1$ is the length of coupler 30;
$\kappa$ is the coupling coefficient of coupler 34;
$l_2$ is the length of coupler 34; and
$\delta_2 = 0$.

The complex amplitude of the guided wave modes at the output $\phi_{o1}$ and $\phi_{o2}$ are related to the complex amplitude of the guided wave modes as the input $\phi_{i1}$ and $\phi_{i2}$ by M.

$$\begin{bmatrix} \phi_{o1} \\ \phi_{o2} \end{bmatrix} = \begin{bmatrix} M_{11} & M_{12} \\ M_{21} & M_{22} \end{bmatrix} \begin{bmatrix} \phi_{i1} \\ \phi_{i2} \end{bmatrix}. \quad (5)$$

For a modulator, $\phi_{i2} = 0$ and $\phi_{o1} = M_{11} \phi_{i1}$, so $T = M_{11}^2$. In this device, only the phase mismatch $\delta_1 l_1$ of the first coupler 30 is controlled by the applied RF voltage.

The parameters $\kappa_1 l_1$, $\phi$ and $\phi_2$ can be varied to minimize the nonlinear distortions. For any specific value of $\kappa_1 l_1$, there is a pair of the phase shift $\phi_2$ and the $\phi$ values that will minimize the third order intermodulation spurious signal.

The nonlinear distortion is calculated by:

$$F(V) = T(V) - [1 + \kappa' V]. \quad (6)$$

Figure 6:
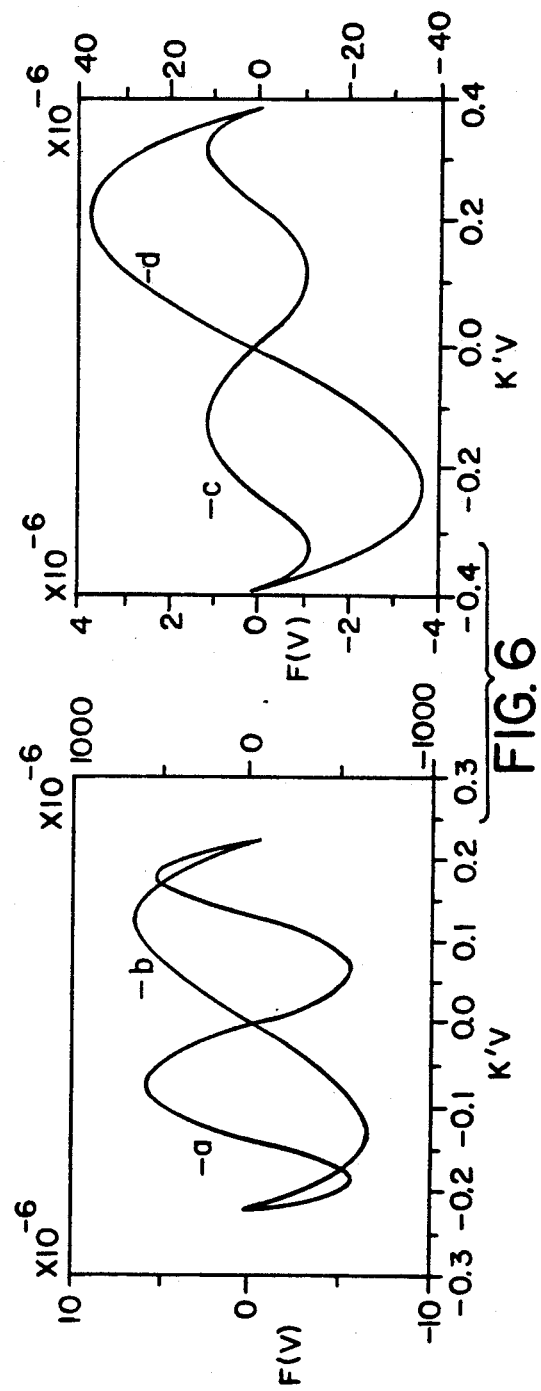
FIG. 6 is a plot of nonlinear distortion for a standard Mach-Zehnder interferometer and the modified directional coupler of FIG. 2.

For each individual choice of the modulation index m, K'V is varied from zero to $\pm 2$ m, and K' is chosen such that $F(V) = 0$ when $K'V = \pm 2$ m. The K'V term is approximately equal to the normalized optical signal power at $I_0 = 1$. This is chosen primarily for mathematical convenience so that a large linear term and the DC term are subtracted from T(V). When the nonlinear distortion of the device is small, F(V) will have a small maximum deviation from the linear term. FIG. 6 shows the calculated F(V) as a function of K'V as follows. Curve a shows the modified directional coupler with $M = 0.11$, $\kappa_1 l_1 = 115°$, $\theta = 25°$ and $\phi_2 = 143°$; curve b for the Mach-Zehnder modulator with $M = 0.11$; curve c is for the modified directional coupler with $M = 0.195$, $\kappa_1 l_1 = 115°$, $\theta = 25.2°$, and $\phi_2 = 142.4°$; and curve d shows the Mach-Zehnder modulator with $M = 0.195$. For the modified directional coupler, $\kappa_1 l_1$, $\phi_2$ and $\theta$ are values chosen to minimize the peak F value from which the spurious signals are calculated. The $2\omega_1 - \omega_2$ and the $2_{107} 2 - \omega_1$ frequency terms of F are calculated by two methods. The first method is to calculate the spectral terms by fast Fourier transform from the time varying output. In the second method, sinusoidal functions have been used to approximate F. The spurious power at $2_{107} 1 - \omega_2$ and $2\omega_2 - \omega_1$ can be obtained explicitly from this approximate function of F. Generally, the results from each of the two methods agree well with each other. Referring back to FIG. 3, curve b shows the achievable ratio of optical signal power to spurious signal power for the modified directional coupler as a function of m. An improvement on the order of 30 to 40 dB has been obtained as compared with the response of a Mach-Zehnder interferometer.

The waveguide modulators of the present invention provide a simple design with inherently low biasing sensitivity and high fabrication tolerance in which third order inter-modulation distortion levels are more than 30 dB lower than a conventional directional coupler or Mach-Zehnder modulators.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. An optical waveguide modulator with extended linear dynamic range comprising:

a first optical waveguide for carrying a first signal comprising a first channel;

a second optical waveguide for carrying a second signal comprising a second channel;

an active coupling section disposed upon first said optical waveguide and said second optical waveguide and having a first pair of electrodes for coupling said first channel and said second channel, said active coupling section having a first coupling length and a fixed amount of coupling;

a voltage source for providing an electrical signal to said active coupling section through said first pair of electrodes to induce a controlled mismatch in propagation constants between said first channel and said second channel;

a first and a second passive coupling section connected to said active coupling section by said first optical waveguide and said second optical waveguide and having a second and third pair of electrodes, respectively, said first and said second passive coupling sections having a plurality of variable parameters for providing feed forward interaction with said active coupling section to compensate for nonlinearities;

a first bias voltage source connected to said second pair of electrodes; and a second bias voltage source connected to said third pair of electrodes;

wherein variable parameters of said plurality are controlled independent of said active coupling section in response to nonlinear distortion calculated for said active coupling section.

2. An optical waveguide modulator as in claim 1 wherein said second passive coupling section comprises a fixed directional coupler to which is applied a second bias voltage from said second bias voltage source through said third pair of electrodes.

3. An optical waveguide modulator as in claim 2 wherein said first passive coupling section comprises a Mach-Zehnder interferometer which introduces a fixed phase shift into one of said first and second channels; said fixed phase shift being one of said variable parameters.

4. An optical waveguide modulator as in claim 2 wherein said first passive coupling section comprises a fixed directional coupler to which is applied a first bias voltage from said first bias voltage source through said second pair of electrodes.

5. An optical waveguide modulator as in claim 4 wherein said first bias voltage and said second bias voltage comprise said variable parameters and are controlled independently of each other to compensate for non-linearities.

6. An optical waveguide modulator as in claim 4 wherein said first passive coupling section has a second coupling length and said second passive coupling section has a third coupling length so that the combination of said second coupling length and said third coupling length is at least equal to said first coupling length.

7. A modified directional coupler with improved linearity for coupling a first optical channel carried in a first optical waveguide with a second optical channel carried in a second optical waveguide, the modified directional coupler comprising:

a first active coupling section connected to said first optical channel and said second optical channel, said first active coupling section having a first pair of electrodes, a first coupling length and a fixed amount of coupling;

a first voltage source for providing a first voltage to said first pair of electrodes;

a first and a second passive coupling section connected to said first optical waveguide and said second optical waveguide, having a second pair and a third pair of electrodes, respectively, and having a plurality of variable parameters for providing feed forward interaction with said active coupling section to compensate for nonlinearities of said active coupling section;

a second bias voltage source for providing a second voltage to said second pair of electrodes; and a third bias voltage source for providing a third voltage to said third pair of electrodes;

wherein said variable parameters of said plurality of variable parameters ar controlled by application of said second bias voltage and said third bias voltage independent of said active coupling section in response to nonlinear distortion calculated for said active coupling section.

8. A modified directional coupler as in claim 7 wherein said second passive coupling section comprises a fixed directional coupler to which is applied said second bias voltage.

9. A modified directional coupler as in claim 7 wherein said first passive coupling section comprises a MachZehnder interferometer which introduces a fixed phase shift into one of said first and second optical channels, said fixed phase shift being one of said variable parameters.

10. A modified directional coupler as in claim 8 wherein said first passive coupling section comprises a fixed directional coupler to which is applied said second voltage.

11. A modified directional coupler as in claim 10 wherein said first passive coupling section has a second coupling length and said second passive coupling section has a third coupling length wherein the combination of said second coupling length and said third coupling length is at least equal to said first coupling length.

12. A modified optical directional coupler for coupling a first optical channel carried by a first optical waveguide with a second optical channel carried by a second optical waveguide, said optical directional coupler comprising:

a first coupling section connected to said first optical waveguide and said second optical waveguide and having a first pair of electrodes, a first coupling length and a fixed amount of coupling for coupling said first optical channel and said second optical channel;

a first voltage source connected to said first coupling section through said first pair of electrodes for providing a controlled mismatch in propagation constants between said first optical channel and said second optical channel;

a second and a third coupling section having a second and a third pair of electrodes, respectively, which, combined, have a second coupling length at least as long as said first coupling length, said second and third coupling sections being connected to said first optical waveguide and said second optical waveguide;

a first bias voltage source connected to said second pair of electrodes for providing a first bias voltage to said second coupling section; and a second bias voltage source connected to said third pair of electrodes for providing a second bias voltage to said third coupling section;

wherein said first bias voltage and said second bias voltage are individually adjusted to introduce additional coupling to said fixed amount of coupling provided by said first coupling section between said first optical channel and said second optical channel.

13. A modified optical directional coupler for coupling a first optical channel within a first optical waveguide with a second optical channel within a second optical waveguide, said optical directional coupler comprising:

a first coupling section having a fixed amount of coupling, connected to said first optical waveguide and said second optical waveguide;

a voltage source connected to a first pair of electrodes on said first coupling section for providing a controlled mismatch in propagation constants between said first optical channel and said second optical channel;

a second coupling section connected to said first optical waveguide and said second optical waveguide having a second pair of electrodes and comprising a Mach-Zender interferometer having a fixed phase shift; and a third coupling section connected to said first optical waveguide and said second optical waveguide having a third pair of electrodes to which is applied a bias voltage from a second voltage source;

wherein said fixed phase shift and said bias voltage are controlled to provide additional coupling to said fixed amount of coupling to compensate for nonlinearities introduced by said first coupling section.

14. A method for improving linearity of an optical directional coupler for coupling a first optical waveguide with a second optical waveguide, the method which comprises:

providing a directional coupler waveguide structure having two optical waveguides with a length of at least two coupling lengths;

forming three electrode pairs over said waveguide structure;

defining an active region with a first electrode pair being at least one coupling length long;

defining two passive sections with a second electrode pair and a third electrode pair having a combined total length of at least one coupling length;

applying an input voltage to said first electrode pair to induce a mismatch in propagation constants of two optical channels being coupled, one channel corresponding to each of said first and second optical waveguides;

applying a first bias voltage to said second electrode pair and a second bias voltage to said third electrode pair; and adjusting said first bias voltage and said bias voltage to minimize nonlinearities introduced by said active section.

* * * * *

UNITED STATES PATENT AND TRADEMARK OFFICE
CERTIFICATE OF CORRECTION

PATENT NO. : 5,230,028
DATED      : July 20, 1993
INVENTOR(S) : Zong-Qi Lin, et al.

It is certified that error appears in the above-identified patent and that said Letters Patent is hereby corrected as shown below:

Column 8, claim 7, line 18, change "ar" to -- are--.

Column 8, claim 10, line 35, after "second" insert --bias--

Column 10, claim 14, line 28, after "said" (second occurrence) insert --second--.

Signed and Sealed this

Twelfth Day of April, 1994

Attest:

BRUCE LEHMAN

Attesting Officer

Commissioner of Patents and Trademarks